(12) United States Patent
Trikalinou et al.

(10) Patent No.: US 11,354,415 B2
(45) Date of Patent: Jun. 7, 2022

(54) WARM BOOT ATTACK MITIGATIONS FOR NON-VOLATILE MEMORY MODULES

(71) Applicant: Intel Corporation, Santa Clara, CA (US)

(72) Inventors: Anna Trikalinou, Beaverton, OR (US); Daniel S. Lake, Hillsboro, OR (US); Sham M. Datta, Hillsboro, OR (US); Asher M. Altman, Bedford, MA (US); John K. Grooms, Webster, MA (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 16/457,928

(22) Filed: Jun. 29, 2019

(65) Prior Publication Data

US 2019/0325142 A1 Oct. 24, 2019

(51) Int. Cl.
*H04N 7/16* (2011.01)
*G06F 7/04* (2006.01)
*G06F 21/57* (2013.01)
*G06F 12/14* (2006.01)
*G06F 21/79* (2013.01)

(52) U.S. Cl.
CPC ........ *G06F 21/575* (2013.01); *G06F 12/1408* (2013.01); *G06F 21/79* (2013.01); *G06F 2212/1052* (2013.01); *G06F 2221/034* (2013.01)

(58) Field of Classification Search
CPC .... G06F 21/575; G06F 12/1408; G06F 21/79; G06F 2212/1052; G06F 2221/034
USPC .......................................................... 726/29
See application file for complete search history.

(56) References Cited

U.S. PATENT DOCUMENTS

| 6,009,495 | A | 12/1999 | DeRoo et al. | |
| 6,185,678 | B1 * | 2/2001 | Arbaugh | G06F 21/575 |
| | | | | 713/2 |
| 7,003,676 | B1 * | 2/2006 | Weber | G06F 21/74 |
| | | | | 713/172 |
| 7,007,300 | B1 * | 2/2006 | Weber | 726/21 |
| 10,303,879 | B1 * | 5/2019 | Potlapally | G06F 21/74 |

(Continued)

OTHER PUBLICATIONS

Xiang Pan; NVCool: When Non-Volatile Caches Meet Cold Boot Attacks; 2018 IEEE 36th International Conference on Computer Design; pp. 439-448.*

(Continued)

*Primary Examiner* — Monjur Rahim
(74) *Attorney, Agent, or Firm* — Alliance IP, LLC

(57) ABSTRACT

Technologies disclosed herein provide mitigations against warm boot attacks on memory modules. For instance, in one embodiment, a non-volatile dual in-line memory module (NVDIMM) in a host computing system may detect a transition from a low-power state to a full-power state, receive a nonce value from a processor of the host computing system after the transition, verify the nonce value, and allow access to data stored on the NVDIMM based on successful verification of the nonce value. In another embodiment, an NVDIMM may be locked in response to detecting a transition from a high-power state to a low-power state in a host computing system. After a transition from the low-power state to the full-power state, the NVDIMM may obtain one or more passphrases, verify the one or more passphrases, and allow access to data stored on the NVDIMM based on successful verification of the one or more passphrases.

24 Claims, 8 Drawing Sheets

(56) References Cited

U.S. PATENT DOCUMENTS

| | | | | |
|---|---|---|---|---|
| 10,389,709 | B2* | 8/2019 | Potlapally | H04L 63/0853 |
| 10,650,159 | B1* | 5/2020 | Paczkowski | G06F 21/6218 |
| 2002/0178354 | A1* | 11/2002 | Ogg | G07B 17/00733 |
| | | | | 713/155 |
| 2003/0041248 | A1* | 2/2003 | Weber | G06F 21/85 |
| | | | | 713/182 |
| 2009/0259854 | A1* | 10/2009 | Cox | G09G 5/001 |
| | | | | 713/189 |
| 2009/0319782 | A1* | 12/2009 | Lee | G06F 21/575 |
| | | | | 713/156 |
| 2010/0070747 | A1* | 3/2010 | Iyigun | G06F 12/0866 |
| | | | | 713/2 |
| 2011/0063093 | A1* | 3/2011 | Fung | G06Q 10/0875 |
| | | | | 340/10.52 |
| 2011/0154010 | A1* | 6/2011 | Springfield | H04L 9/3234 |
| | | | | 713/100 |
| 2012/0102334 | A1* | 4/2012 | O'Loughlin | G06F 12/1408 |
| | | | | 713/189 |
| 2012/0249563 | A1* | 10/2012 | Wyatt | G06F 3/14 |
| | | | | 345/522 |
| 2014/0082724 | A1* | 3/2014 | Pearson | G06F 1/3234 |
| | | | | 726/22 |
| 2016/0300064 | A1* | 10/2016 | Stewart | G06F 3/0619 |
| 2016/0344709 | A1* | 11/2016 | Sadhasivan | G09C 1/00 |
| 2017/0168747 | A1* | 6/2017 | Han | G06F 9/4405 |
| 2017/0230179 | A1 | 8/2017 | Mannan et al. | |
| 2018/0323967 | A1* | 11/2018 | Courtney | H04L 9/0656 |
| 2019/0311128 | A1* | 10/2019 | Liguori | H04L 9/14 |
| 2020/0313890 | A1* | 10/2020 | Mondello | H04W 4/023 |
| 2020/0396054 | A1* | 12/2020 | Wu | G06F 3/0659 |

OTHER PUBLICATIONS

Branco, Rodrigo, et al.; "Blinded Random Corruption Attacks," IEEE International Symposium on Hardware Oriented Security and Trust, 2016; 6 pages.

Nexus Technology; "The Nexus Difference, DDR4 Interposers," accessed on the internet at http://www.nexustechnology.com/wp-content/uploads/2016/09/DDR4-lnterposers.pdf; Sep. 2016; 4 pages.

EPO; Extended European Search Report issued for EP Patent Application No. 20164179.2, dated Oct. 8, 2020; 8 pages.

* cited by examiner

WARM BOOT ATTACK MITIGATIONS FOR NON-VOLATILE MEMORY MODULES

TECHNICAL FIELD

This disclosure relates in general to the field of computer systems and, more particularly, to mitigations for warm boot attacks on non-volatile memory modules.

BACKGROUND

A "warm boot" attack can occur when a memory module (e.g., a dual in-line memory module (DIMM), or non-volatile DIMM (NVDIMM)) is in a self-refresh state during a low-power system state (e.g., a S3, or "sleep", system power state). As defined by the JEDEC Specifications, during the self-refresh state, no transactions to/from memory occur, and memory contents are preserved. The warm boot attack relies on the attacker providing external power to the memory module, independently from the host computing system, so that the attacker may maintain the memory module in the "self-refresh" state while he/she physically disconnects it from the victim host computing system. By doing this, the attacker can steal the memory module from the victim system with all the memory contents intact, connect it to the attacker's system (different from the victim system), read the data and/or corrupt it. Further, the attacker can insert the memory module back into the victim host computing system with the corrupted/malicious data and allow the victim system consume it without detection.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
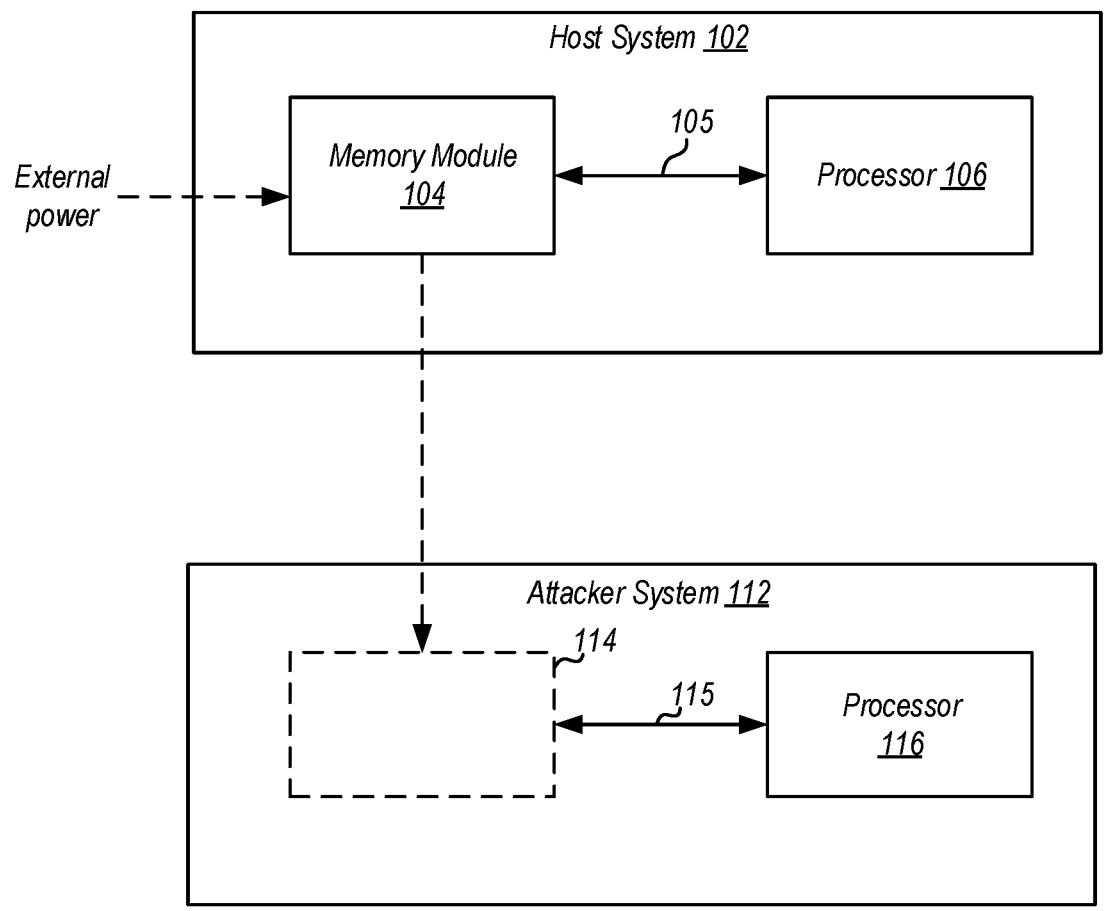
FIG. 1 is a simplified block diagram illustrating an example warm boot attack on a memory module according to at least one embodiment of the present disclosure.

The following disclosure provides various possible embodiments, or examples, for mitigating warm boot attacks on memory modules. A "warm boot" attack may allow an attacker with physical access to a powered-on victim computing system, but without privileges (e.g., ring 3, ring 0 or ring −1), to gain access to the entire memory contents of the memory module. The difference between this attack and a conventional "cold boot" attack is that the attacker can retrieve 100% of the data with no data loss. In addition, the warm boot attack may be applicable to all DDR memory modules regardless of the manufacturer, may be independent of the memory module temperature, and may be independent of time.

The warm boot attack can occur when a memory module (e.g., a dual in-line memory module (DIMM), or non-volatile DIMM (NVDIMM)) is in a self-refresh state, which may occur primarily during low-power system states (e.g., a S3/sleep system power state). As defined by the JEDEC Specifications, during the self-refresh state, there may be no transactions to/from memory and memory contents may be preserved in memory. The reason why the memory contents remain in memory (e.g., as opposed to an S4 hibernate state, where the contents are moved to the disk) is so the system can wake-up and transition to the S0 (normal operation) state quickly. During the self-refresh state, the memory module may be responsible for issuing periodic refresh commands to maintain the electric charge on its memory capacitors (e.g., where the presence of charge equals to binary 1, absence of charge equals to binary 0). To perform the refreshes, the memory module receives and uses power from the host computing system to which it is coupled.

The warm boot attack relies on the attacker providing external power to the memory module, independently from the system, so that the attacker maintains the memory module in the self-refresh state while he/she physically disconnects it from the victim host computing system. By doing this, the attacker can remove the memory module from the victim system with all the memory contents intact, connect it to the attacker's own computing system (different from the victim system), and read or corrupt the data. Further, the attacker can insert the memory module with the corrupted/malicious data back into the victim system and let the victim consume it, without detection. This attack applies to all memory modules that are compliant with the universal JEDEC DDR specifications.

One current mitigation against this attack is using memory encryption, integrity protection and replay protection, similar to Intel® Software Guard Extensions Memory Encryption Engine (SGX MEE). Unfortunately, MEE may have relatively high performance overhead, which may make it less suitable for protecting the entire contents of the memory module when compared to the mitigations of the present disclosure.

Another current mitigation includes partially protecting against the warm boot attack using (MK)TME with Integrity. MKTME encrypts memory contents with a per-system key and Integrity stores a MAC in the memory associated with the data contents. However, an attacker has still access to both the ciphertext and the MAC and can perform a replay attack, i.e. capture an old image of the ciphertext+MAC and replay that image on a later point in time. In other words, an attacker can perform a warm boot attack and can save the ciphertext+MAC of the address of interest, return the memory back, and then perform the attack again at a later stage and replace the memory contents with the old copy. Using just MKTME alone can provide a level of protection, since the attacker would now only have access to ciphertext. However, MKTME is insufficient as there are already published papers on how an attacker can corrupt encrypted memory to bypass operating system login authentication.

Accordingly, certain aspects of the present disclosure provide mitigations against the warm boot attack on memory modules such as NVDIMMs as described below, including: (1) hiding traces that an attacker needs to expose to perform the physical attack, (2) defining a CPU-NVDIMM handshake, (3) modifying an NVDIMM driver to block entry into an S3 system power state, and (4) locking the NVDIMM during the self-refresh states caused by transitions into an S3 system power state. In some instances, one or more of these mitigations may be combined with one another, or may be combined with other mitigations against a warm boot attack. Example embodiments of these concepts are described further below.

FIG. 1 is a simplified block diagram illustrating an example warm boot attack on a memory module according to at least one embodiment of the present disclosure. In the example shown, a host computing system 102 includes a memory module 104 coupled to a processor 106 via link 105. In some implementations the memory module 104 may be implemented as a dual in-line memory module (DIMM), such as, for example, a non-volatile DIMM (NVDIMM). To implement the warm boot attack, an attacker may apply external power to the memory module 104, independently from the host computing system 102, while the host computing system 102 is in a low-power state (e.g., an S3 system power state). By doing this, the memory module 104 may be maintained in a self-refresh state (as described above) while the attacker physically disconnects the memory module 104 from the host computing system 102 (keeping the contents of the memory module 104 intact).

The attacker then places the memory module 104 into a memory slot 114 of the attacker's computing system 112. Typically, the attacker computing system 112 (using processor 116 via link 115) may be able to read or corrupt the data on the memory module 104. However, a memory module 104 implemented with one or more of the mitigations described herein may prevent the attacker computing system 112 from accessing data on the memory module 104, thus preventing any potential attack on the data or the host computing system 102.

Figure 2:
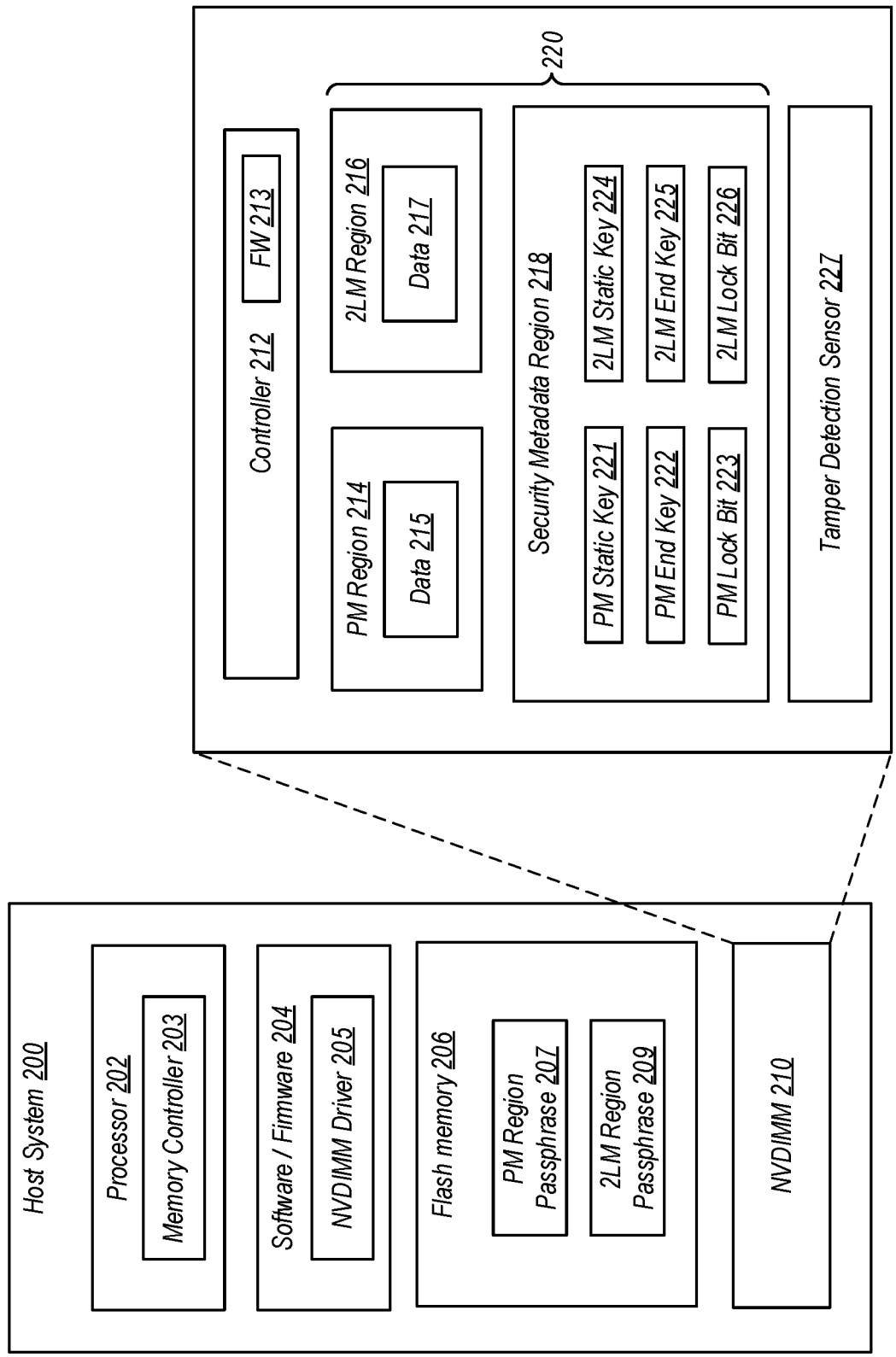
FIG. 2 is a simplified block diagram illustrating an example non-volatile dual in-line memory module (NVDIMM) in a host computing system according to at least one embodiment.

FIG. 2 is a simplified block diagram illustrating an example non-volatile dual in-line memory module (NVDIMM) 210 in a host computing system 200 according to at least one embodiment. In the example shown, the host computing system 200 includes a processor 202 (which includes a memory controller 203), software and firmware 204, and flash memory 206. The processor 202 may be implemented similar to the processors described below with respect to FIGS. 6-7. The flash memory 206 may be implemented, in some instances, in a chipset or other controller of the host computing system (e.g., in a management engine (ME) chipset).

The NVDIMM 210 includes a controller 212 (which includes firmware 213) and memory 220, which is logically separated into a persistent memory (PM) region 214 that stores data 215, a second level memory (2LM) region 216 that stores data 217, and a security metadata region 218 that stores one or more keys (e.g., 221, 222, 224, 225) associated with encryption or decryption of the data 215, 217 and lock bits (e.g., 223, 226) that control access to the respective PM and 2LM regions. The controller 212 may be implemented by a microprocessor, microcontroller, field-programmable gate array (FPGA), application specific integrated circuit (ASIC), or another type of data processing apparatus. The controller 212 may control access to the data 215, 217, and may also implement the functionality of certain mitigations described below (e.g., generation and verification of nonce values, or locking the NVDIMM upon transition to a low-power system state).

In the example shown, the PM region 214 is password-protected, whereby a PM region passphrase 207 is used (with a PM static key 221) to derive a PM end key 222 that is used to encrypt/decrypt the data 215 in the PM region 214. For example, when a user boots the host computing system 200 with the NVDIMM 210 coupled thereto, the user is prompted to enter the passphrase to gain access to the NVDIMM PM data 215. Once the user enters the password, the host computing system stores the passphrase (as PM passphrase 207) and the NVDIMM generates the PM end key 222 based on the PM passphrase 207 (e.g., using the PM passphrase 207 and the PM static key 221) and any subsequent PM data 215 accesses use the PM end key 222 to correctly decrypt the data 215 and deliver the plaintext to the processor 202. Typically, the PM end key may be preserved during a single power-cycle. This means that if the legitimate user unlocks the NVDIMM PM region at first boot, and then the host computing system 200 later enters a low-power mode (e.g., S3 sleep state) and back to a normal operation full-power mode (e.g., resume to the S0 power state), the passphrase won't be requested again and the NVDIMM PM region 214 will remain unlocked to any user. This vulnerability allows for a potential warm boot attack to be performed on the NVDIMM 210 as described above.

To block this vulnerability, in certain implementations, the PM region 214 may be locked upon transition into a low-power (e.g., S3) state. The PM region 214 may be locked by setting the PM lock bit 223. When the PM lock bit is set, data in the PM region is not accessible by the host computing system. To unlock the PM region, the host computing system needs to provide the PM passphrase to the NVDIMM for re-verification. Upon successful re-verification, the PM lock bit is reset. In some instances, locking the PM region 214 may include erasing (e.g., zeroizing) the PM end key 222 (requiring the NVDIMM 210 to retrieve the PM passphrase 207 from the host computing system 200 and re-generate the PM end key 222), or by requiring a user to re-enter the PM passphrase 207 after the transition from the low-power state to the full-power state in other instances. In some implementations, the PM end key 222 has a fixed length of 32 bytes. In some cases, the host computing system 200 (via software or firmware 204), may provide the PM passphrase 207 to the NVDIMM 210. The passphrase 207 may be provided transparently from the user (e.g., via a baseboard management controller (BMC) interface), or the user may provide it manually. To avoid excessive user interaction, in some cases, the user may provide the passphrase only once at boot, and the host computing system 200 may store it in the flash memory 206 (e.g., ME SPI Flash memory, where it may be encrypted with a platform key) so that the passphrase 207 is retrieved upon any subsequent transitions from a low-power state to a full-power state.

The 2LM region 216 simulates the behavior of traditional volatile DRAM, though the region 216 is implemented with persistent memory. The data 217 in the 2LM region 216 is encrypted using a per-boot 2LM end key 225 that is generated by the NVDIMM 210 on every boot. To generate the 2LM end key 225, the host computing system may generate a 2LM passphrase 209 upon boot, and the NVDIMM retrieves and uses the 2LM passphrase 209 to generate the 2LM end key 225 (e.g., using the 2LM static key 224, similar to the process used to generate the PM end key 222). After a boot cycle, the old 2LM end key is lost/erased and a new one is generated. That means that even though old data from the previous boot-cycle is still in the 2LM region 216, it is encrypted with the old, non-recoverable 2LM end key. Typically, during a transition into a low-power state (e.g., S3 state), the 2LM end key 225 is preserved on the NVDIMM 210 to allow the legitimate user of the host computing system 200 to access their data after the transition back to the full-power state (e.g., S0 state), allowing a potential warm boot attack to be performed on the NVDIMM 210.

To block this vulnerability, in certain implementations, the 2LM region 216 may be locked upon transition into a low-power (e.g., S3) state in a similar fashion as discussed above with respect to the PM region 214. For instance, the 2LM lock bit 226 may be set upon the transition into the low-power state. In some instance, locking the 2LM region 216 may include erasing (e.g., zeroizing) the 2LM end key 225 in some instances, requiring the NVDIMM 210 to retrieve the 2LM passphrase 209 from the host computing system 200 and re-generate the 2LM end key 225. In some implementations, the 2LM end key 225 has a fixed length of 32 bytes. Similar to the PM region mechanism described above, the 2LM passphrase 209 may be provided to the NVDIMM 210 upon every low- to full-power state transition to unlock the 2LM region 216. The 2LM passphrase may be newly generated on every reset by the host firmware 204 (that is, there may be a different passphrase on every reset). Once the 2LM passphrase 209 is generated by the host firmware, it may be stored in the flash memory 206 (e.g., ME SPI Flash memory). The 2LM passphrase 209 may be provided to the NVDIMM (e.g., to firmware 213) via a DDR-T based command interface or a system management bus (SMBus) interface. The firmware 213 may wrap the 2LM passphrase 209 with the 2LM static key 224 and store it in the security metadata region 218 (which may be implemented as a 3DXP Security Metadata Region). On every subsequent transition from a low-power state to a full-power state (during the same reset cycle), the hose firmware 204 may re-send the 2LM passphrase 209 to the NVDIMM 210 prior to accessing any 2LM data 217. The NVDIMM firmware 213 may wrap the received passphrase with the 2LM static key 224 and compare it with the stored 2LM end key 225. If they match, access to 2LM data 217 is allowed by the host computing system 200. Otherwise, access to the 2LM data 217 (or 2LM region 216, generally) is blocked/not allowed until a reset is performed. Upon a reset, the 2LM end key 225 will be reset and the host computing system 200 will not be able to access any previous 2LM data.

In some cases, the processor 202 (via the memory controller 203) and NVDIMM 210 may perform a handshake procedure to prevent a warm boot attack on the NVDIMM 210. The handshake procedure allows the processor 202 to prove its "identity" to the NVDIMM 210 and likewise, allows the NVDIMM 210 to prove its "identity" to the processor 202. The handshake can therefore protect a victim system, where its benign NVDIMM is replaced with a malicious DIMM, as well as against a benign DIMM being inserted into a malicious system to extract or modify the data.

In one form, the handshake can be implemented by using two secret nonces, $N_{NVDIMM}$ and $N_{CPU}$. The NVDIMM 210 may generate $N_{NVDIMM}$ during a power-on phase and may store it in a local control register in the controller. Similarly, the processor 202 may generate $N_{CPU}$ during power-on and may store it in a control register of the memory controller 203. The 2 nonces will be different on each boot and each system. Before the completion of the NVDIMM power-on phase, which includes memory calibration, and before the memory initialization phase, the memory controller 203 may send $N_{CPU}$ to the NVDIMM 210, and the NVDIMM may store it in its control register space in the controller 212. Similarly, the NVDIMM will send $N_{NVDIMM}$ to the memory controller 203, which may store it in its control registers.

After exiting the self-refresh mode in a low-power state, both the NVDIMM 210 and the memory controller 203 may send $N_{NVDIMM}$ and $N_{CPU}$, respectively, and check the nonce they receive against the one they have stored to verify the other party's identity. This may ensure that a) an attacker hasn't replaced a benign NVDIMM with a malicious one, and that b) an attacker hasn't stolen a benign NVDIMM and placed it in a malicious system. If there is any mismatch in the nonces, then the system should fail to enter normal operation, and a power cycle to both the host computing system 200 and the NVDIMM may be required. The reboot would erase the previous 2LM NVDIMM data and would lock the PM NVDIMM data. Also, in the event that an attacker has placed a malicious NVDIMM into a benign system, the system BIOS would attempt to verify the NVDIMM manufacturer and NVDIMM FW on reboot as part of its normal power on/boot procedure, and would not successfully verify the NVDIMM. This potential mitigation may raise the approximate cost of the attack from ~$2 k (without mitigation) to $200 k+(e.g., the approximate cost of a memory interposer). In some cases, to also protect against the interposer attack, this scheme may be enhanced with encryption techniques (e.g., Diffie-Hellman key exchange), integrity protection techniques (e.g., AES-GCM techniques), replay protection techniques (e.g., Merkle tree techniques), or authentication techniques (e.g., digital signature techniques). As an example, in some implementations, a secret key is established between the processor 202 and NVDIMM 210 on every boot according to a Diffie-Hellman key exchange process. The secret key may then be used to encrypt (e.g., via AES-256) the nonce values. In other implementations, an authenticated Diffie-Hellman key exchange technique may be used, where the processor 202 and NVDIMM 210 each have a public-private asymmetric key pair used for digitally signing each message they send and for verifying each message they receive from one another. This technique may avoid any man-in-the-middle attacks (e.g., via an interposer).

Another potential mitigation of the warm boot attack includes physically hiding or obscuring critical electrical traces on the NVDIMM 210 that are needed to perform the attack. For example, the NVDIMM 210 may be enclosed by a heat sink shim, but it may be easily removed with a chemical solution in some cases, allowing access to the critical traces. Also, those signals/traces may be exposed both on the metal fingers of the NVDIMM 210 and/or on the PCB of the NVDIMM 210. To prevent this vulnerability, those traces may be "hidden" within inner layers of the PCB of the NVDIMM 210, requiring the attacker to either remove the outer PCB layers to expose the necessary traces or to access the traces through the NVDIMM metal fingers. This would make the attack more difficult to perform, as the metal fingers are not easily accessible when the module is inserted into the socket, and the attacker would have the risk of shorting the circuit. In some implementations, a tamper detection sensor (e.g., 227) may also be implemented on the NVDIMM 210 to detect any tampering aimed at gaining access to the critical traces. For example, the NVDIMM 210 may be implemented with a hidden switch under a heat sink that is triggered if the heat sink is removed (e.g., to access the traces). As another example, the NVDIMM 210 may be modified to include an opaque enclosure designed to include a tamper detection sensor (e.g., a switch). If tampering is detected by the sensor 227, the NVDIMM 210 may zeroize or erase any keys stored on the NVDIMM 210 (e.g., end keys 222, 225), making the data inaccessible. By implementing the concepts of this mitigation, the approximate cost of performing a warm boot attack on the NVDIMM 210 rises from ~$2 k (without mitigation) to >$10 k (e.g., the cost of a DIMM riser or similar technology for exposing the metal fingers). On the flip side, the cost of implementing this mitigation is relatively small.

Yet another potential mitigation of the warm boot attack includes modification of a driver for the NVDIMM (e.g., driver 205). Since the vulnerable state when this attack can be performed is when the NVDIMM 210 is in the self-refresh state, a very simple mitigation to never allow the system to go into a low-power state in which the self-refresh mode is enabled (e.g., the S3 state). To do this, the NVDIMM driver 205 can be updated to never support such low-power states. If the system does enter such a low-power state, the driver 205 may trigger a system reboot. This can prevent an attacker from replacing a benign NVDIMM with a malicious one, since a reboot will be performed. While the driver may be replaced or patched by an attacker, the attacker would need ring-0 privileges, and if the attacker has managed to have ring-0 privileges, then he/she already has access to the full memory contents and doesn't need to replace or patch the driver to steal the memory contents.

Figure 3:
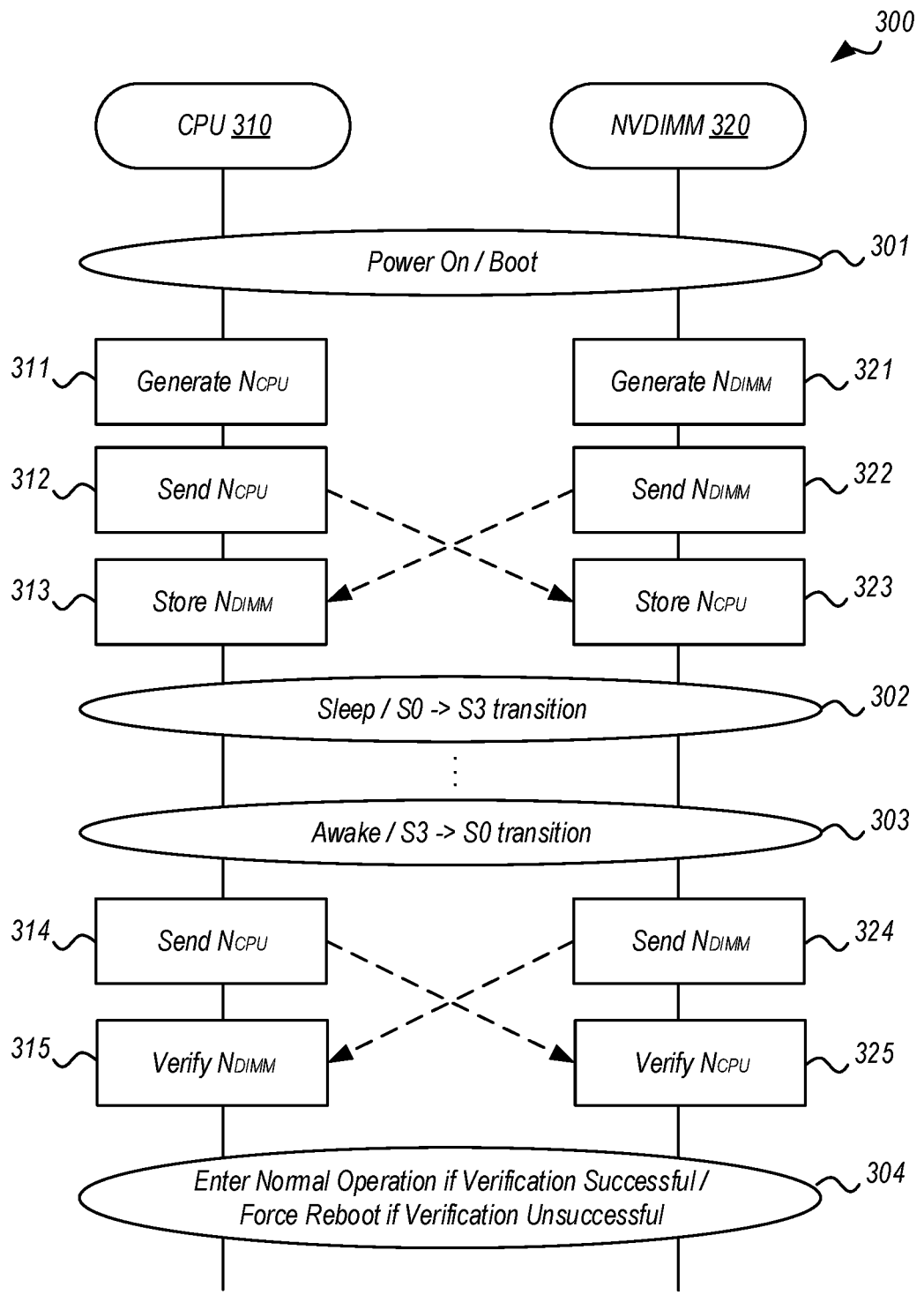
FIG. 3 is a simplified flowchart that illustrates an example handshake process between a CPU and an NVDIMM to prevent a warm boot attack according to at least one embodiment.

FIG. 3 is a simplified flowchart that illustrates an example handshake process 300 between a CPU 310 and an NVDIMM 320 to prevent a warm boot attack according to at least one embodiment. The CPU 310 may be implemented similar to the processor 202 of FIG. 2, and the NVDIMM 320 may be implemented similar to the NVDIMM 210 of FIG. 2. The CPU 310 and NVDIMM 320 may be part of a host computing system implemented similar to the host computing system 200 of FIG. 2. The example process 300 may include additional or different operations, and the operations may be performed in the order shown or in another order. In some cases, one or more of the operations shown in FIG. 3 are implemented as processes that include multiple operations, sub-processes, or other types of routines. In some cases, operations can be combined, performed in another order, performed in parallel, iterated, or otherwise repeated or performed another manner. In some implementations, the operations shown in FIG. 3. may be implemented as instructions embodied in a non-transitory computer-readable storage media that are executable by at least one processor.

At 301, the host computing system powers on and boots. Thereafter, the CPU generates a nonce value $N_{CPU}$ at 311 and the NVDIMM generates a nonce value $N_{NVDIMM}$ at 321. This may be done before the completion of the NVDIMM power-on phase, which includes memory calibration, and before the memory initialization phase, in some instances. The CPU sends the nonce value $N_{CPU}$ to the NVDIMM at 312, and the NVDIMM stores the value at 323 (e.g., in a local control register of the NVDIMM controller). Likewise, the NVDIMM sends the nonce value $N_{NVDIMM}$ to the CPU at 322, and the CPU stores the value at 313 (e.g., in a control register in its memory controller).

Then, at 302, the host computing system transitions from its full-power (S0) system state to a low-power (S3) system state. At some time later, at 303, the host computing system transitions out of its low-power (S3) system state to its full-power (S0) system state. In response, the CPU sends the nonce value $N_{CPU}$ to the NVDIMM at 314, and the NVDIMM sends the nonce value $N_{NVDIMM}$ to the CPU at 324. At 315, the CPU verifies the received nonce value $N_{NVDIMM}$ against the nonce value $N_{NVDIMM}$ previously stored at 313. Likewise, at 325, the NVDIMM verifies the received nonce value $N_{CPU}$ against the nonce value $N_{CPU}$ previously stored at 323. If both nonce values are successfully verified at 315 and 325 (e.g., the nonce values match), then the host computing system enters its normal operation mode at 304. However, if one or both nonce values are not successfully verified at 315 and 325 (e.g., the nonce values don't match), then the host computing system is forced to reboot at 304.

The nonce values $N_{CPU}$ and $N_{NVDIMM}$ may be random numbers, in some implementations. In some implementations, the CPU 310 and NVDIMM 320 establish a secret key on every boot according to a Diffie-Hellman key exchange process. The secret key may then be used to encrypt (e.g., via AES-256) the nonce values. In other implementations, an authenticated Diffie-Hellman key exchange technique may be used, where the CPU 310 and NVDIMM 320 each have a public-private asymmetric key pair used for digitally signing each message they send and for verifying each message they receive from one another. This technique may avoid any man-in-the-middle attacks (e.g., via an interposer).

Figure 4:
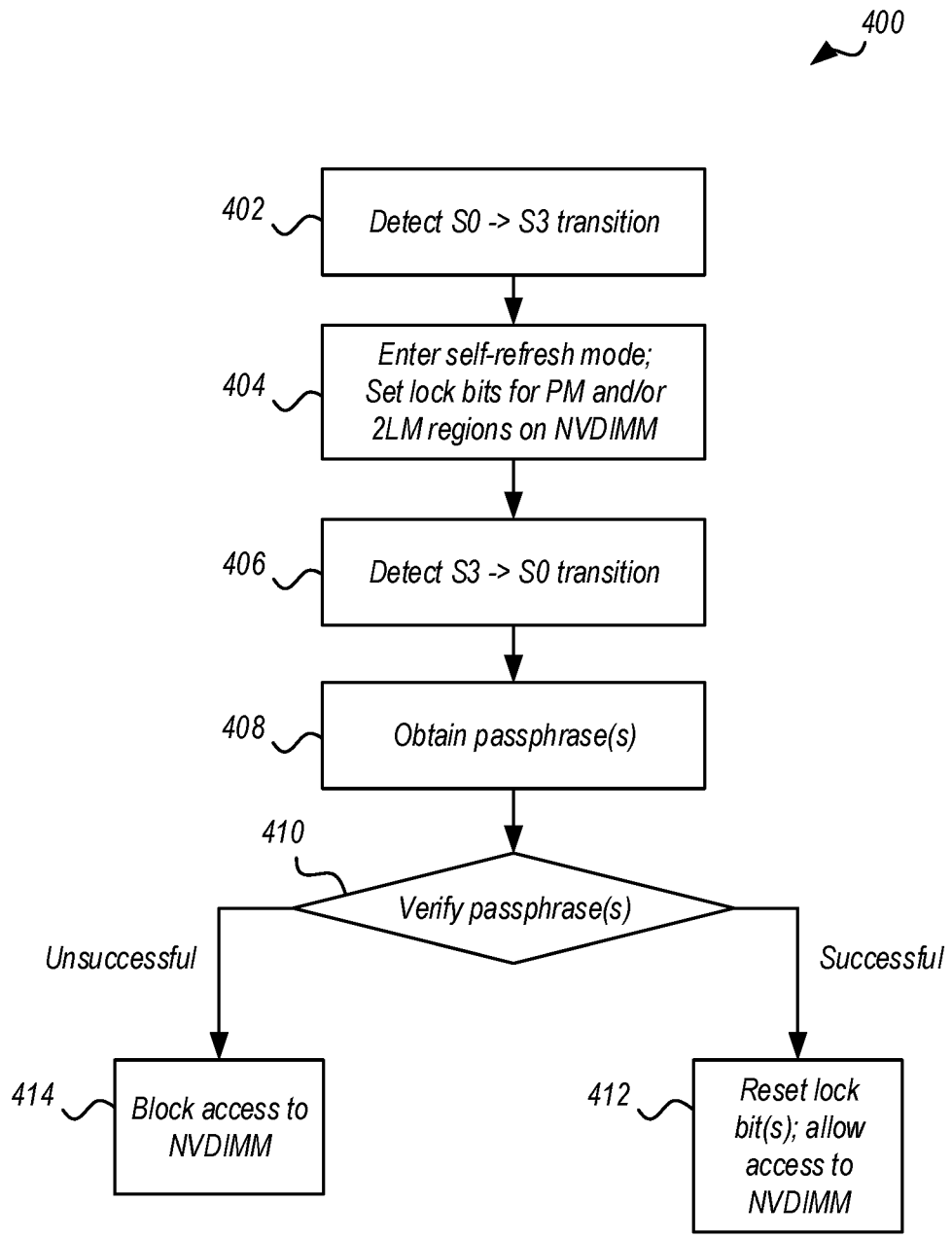
FIG. 4 is a simplified flowchart that illustrates an example process of locking an NVDIMM in response to transitioning from a full-power system state to a low-power system state to prevent a warm boot attack according to at least one embodiment.

FIG. 4 is a simplified flowchart that illustrates an example process of locking an NVDIMM in response to transitioning from a full-power system state to a low-power system state to prevent a warm boot attack according to at least one embodiment. Operations in the example process 400 may be performed by one or more components of a memory module (e.g., controller 212 of NVDIMM 210 of FIG. 2). The example process 400 may include additional or different operations, and the operations may be performed in the order shown or in another order. In some cases, one or more of the operations shown in FIG. 4 are implemented as processes that include multiple operations, sub-processes, or other types of routines. In some cases, operations can be combined, performed in another order, performed in parallel, iterated, or otherwise repeated or performed another manner. In some implementations, the operations shown in FIG. 4. may be implemented as instructions embodied in a non-transitory computer-readable storage media that are executable by at least one processor.

At 402, an S0 to S3 state transition is detected in the host computing system, and at 404, the NVDIMM enters self-refresh mode and locks itself. In some implementations, this may include locking one or more of a PM region of the NVDIMM (e.g., the PM region 214 of FIG. 2) and a 2LM region of the NVDIMM (e.g., the 2LM region 216 of FIG. 2). In some implementations, this may include locking the NVDIMM comprises erasing one or more keys used to decrypt the data stored on the NVDIMM (e.g., the PM end key 222, the 2LM key 225, or both of FIG. 2).

At 406, an S3 to S0 state transition is detected in the host computing system, and at 408, the NVDIMM obtains one or more passphrases to unlock the NVDIMM. The passphrases may include a PM region passphrase (e.g., PM region passphrase 207 of FIG. 2), a 2LM region passphrase (e.g., 2LM region passphrase 209 of FIG. 2), or both. In some implementations, the one or more passphrases may be obtained by retrieving or gathering them from a flash memory of the host computing system (e.g., a ME SPI flash memory). In some implementations the one or more passphrases may be obtained by receiving them via firmware on the host computing system (e.g., firmware 204 of FIG. 2).

At 410, the NVDIMM verifies the passphrases obtained at 408. In some implementations, the passphrases may be verified by generating a new end key based on an obtained passphrase and a static key of the NVDIMM and comparing the new end key with an end key previously stored on the NVDIMM. In some implementations, the passphrases may be verified by comparison with a previously-stored passphrase (e.g., rather than an end key generated based on the passphrase).

If the passphrases are successfully verified at 410, the NVDIMM allows the host computing system (including a processor of the host computing system) to access data on the NVDIMM at 412. If the passphrases are not successfully verified at 410, the NVDIMM blocks access to data on the NVDIMM at 414. In some implementations, the NVDIMM may force a reboot of the host computing system in the event of unsuccessful verification at 410, or may perform another function (e.g., generating an alert).

Figure 5A:
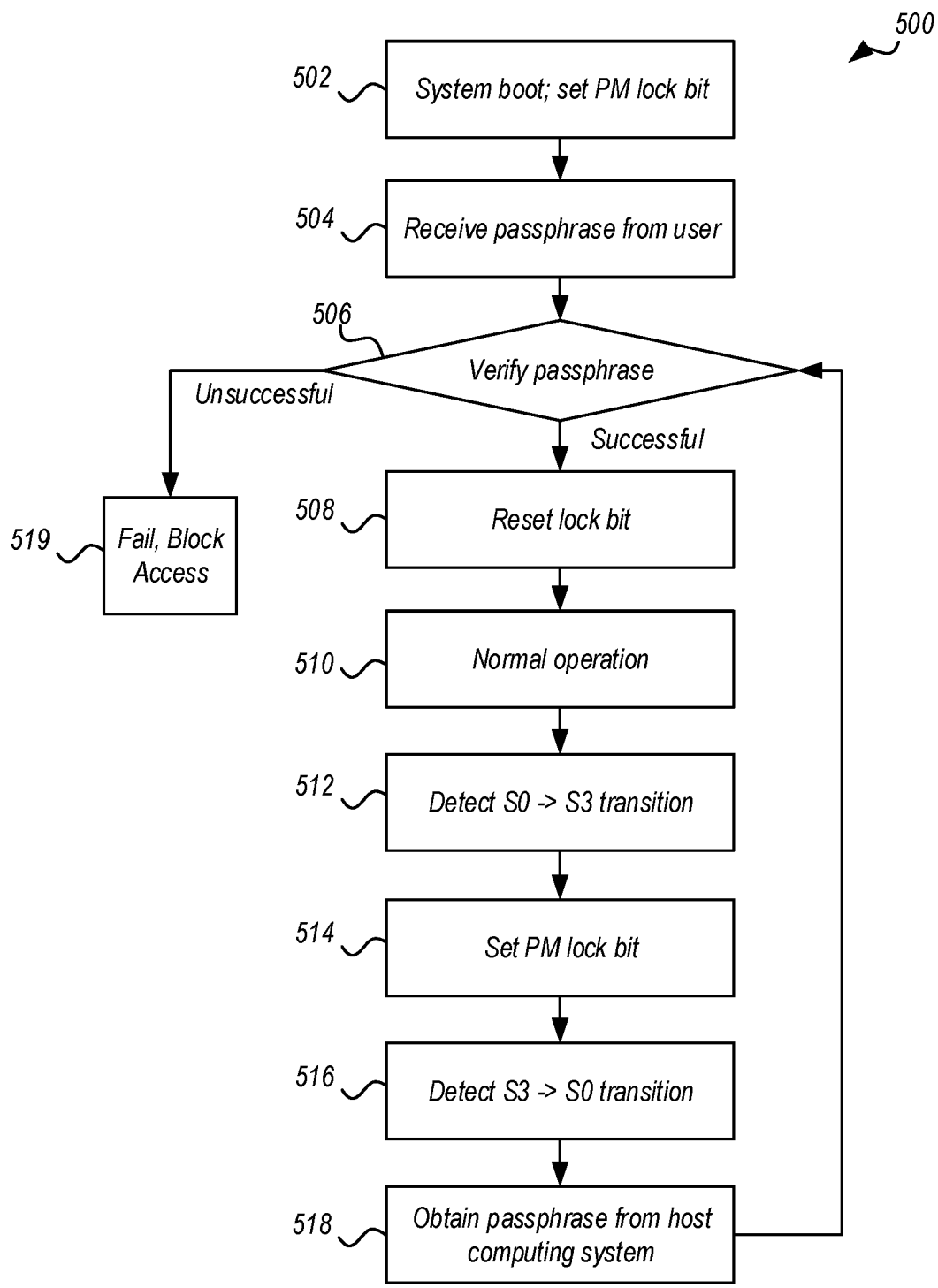
FIGS. 5A-5B are simplified flowcharts that illustrate example processes of locking persistent memory (PM) and a second level memory (2LM) regions of a non-volatile memory module, respectively, according to at least one embodiment.
Figure 5B:
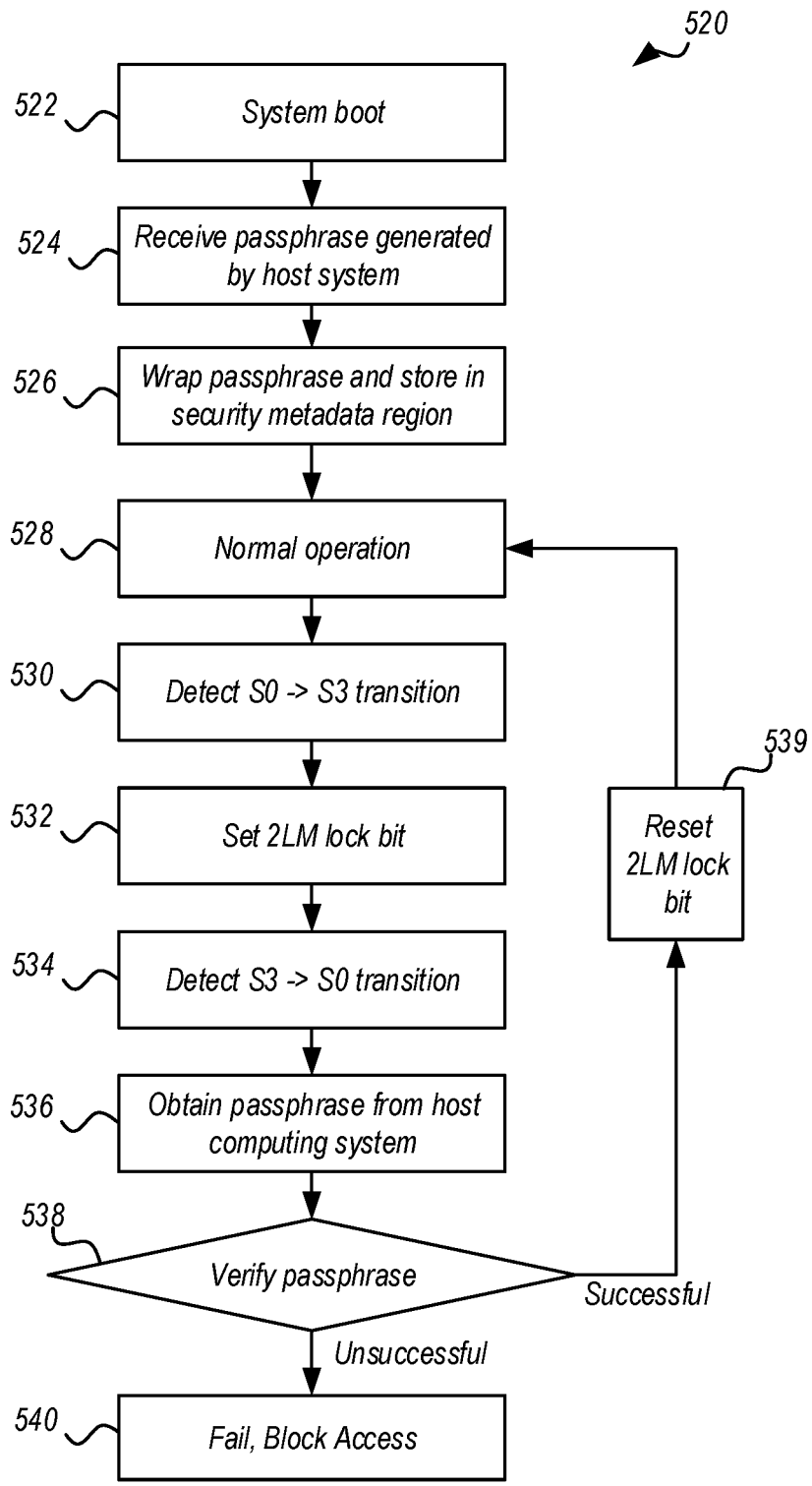

FIGS. 5A-5B are simplified flowcharts that illustrate example processes 500, 520 of locking persistent memory (PM) and a second level memory (2LM) regions of a non-volatile memory module, respectively, according to at least one embodiment. Operations in the example processes 500, 520 may be performed by one or more components of a memory module (e.g., controller 212 of NVDIMM 210 of FIG. 2). The example processes 500, 520 may include additional or different operations, and the operations may be performed in the order shown or in another order. In some cases, one or more of the operations shown in FIGS. 5A-5B are implemented as processes that include multiple operations, sub-processes, or other types of routines. In some cases, operations can be combined, performed in another order, performed in parallel, iterated, or otherwise repeated or performed another manner. In some implementations, the operations shown in FIGS. 5A-5B. may be implemented as instructions embodied in a non-transitory computer-readable storage media that are executable by at least one processor.

Referring to FIG. 5A, at 502, the host computing system boots and at 504, a PM passphrase is received from a user of the host computing system. The PM passphrase may be stored by the host computing system in a flash memory (e.g., ME SPI flash) for later use or retrieval by the NVDIMM.

At 506, the PM passphrase received at 504 is initially verified. The passphrase may be verified by wrapping (e.g., using AES Keywrap techniques) the passphrase (e.g. PM passphrase 207 of FIG. 2) with a static key (e.g., the PM static key 221 of FIG. 2) to produce an end key (e.g., PM end key 222 of FIG. 2). The end key that is produced is then compared with a PM end key previously stored on the NVDIMM. If the PM passphrase is successfully verified at 506, then a PM region lock bit (e.g., PM lock bit 223 of FIG. 2) is reset at 508 and the host computing system enters normal operation at 510. Some time later, at 512, an S0 to S3 state transition is detected in the host computing system, and in response, the PM region is locked at 514 by setting the PM region lock bit (e.g., PM lock bit 223 of FIG. 2).

Some additional time later, at 516, an S3 to S0 state transition is detected in the host computing system, and at 518, the NVDIMM obtains a PM passphrase (e.g., PM passphrase 207 of FIG. 2) to unlock the PM region of the NVDIMM. In some implementations, the PM passphrase may be obtained via host firmware providing the PM passphrase transparently (e.g., via a BMC interface), by a user re-providing the PM passphrase manually, or by the NVDIMM retrieving the PM passphrase from the host computing system.

The NVDIMM then verifies the PM passphrase at 506 as described above. If the passphrase is successfully verified at 506, then the host computing system re-enters normal operation and access to data in the PM region by the host computing system is allowed (e.g., by resetting the PM region lock bit and entering normal operation). If the PM passphrase is not successfully verified at 506, then the NVDIMM blocks access to the PM region data on the memory module by the host computing system at 519.

Referring to FIG. 5B, at 522, the host computing system boots, and at 524, a 2LM passphrase is received from the host computing system. The 2LM passphrase may have been generated by the host computing system during the boot sequence. For example, the host computing system firmware may be configured to generate a new 2LM passphrase on every reset. The host firmware may store the 2LM passphrase in a flash memory of the host computing system, and may provide the 2LM passphrase to the NVDIMM (e.g., via a DDR-T based command interface or an SMBus interface).

At 526, the passphrase received at 524 is wrapped (e.g., using AES Keywrap techniques) with a static key (e.g., 2LM static key 224 of FIG. 2) to produce an end key (e.g., 2LM end key 225 of FIG. 2), and the end key is stored in a security metadata region of the NVDIMM (e.g., security metadata region 218 of FIG. 2). The host computing system enters normal operation at 528. Some time later, at 530, an S0 to S3 state transition is detected in the host computing system, and at 532, the 2LM region of the NVDIMM is locked by setting a 2LM lock bit (e.g., 2LM lock bit 226 of FIG. 2).

Some additional time later, at 534, an S3 to S0 state transition is detected in the host computing system, and at 536, a 2LM passphrase is obtained from the host computing system. The 2LM passphrase may be obtained via the host computing system firmware providing the 2LM passphrase transparently (e.g., via a BMC interface) or by the NVDIMM retrieving the 2LM passphrase from the host computing system.

At 538, the 2LM passphrase received at 536 is verified. The 2LM passphrase may be verified by wrapping the newly received 2LM passphrase as described above and comparing the resulting end key with the 2LM end key previously stored on the NVDIMM. If the wrapped passphrases match, then the 2LM region lock bit is reset at 539 and the host computing system re-enters normal operation at 528, where access to data in the 2LM region by the host computing system is allowed. If the 2LM passphrase is not successfully verified at 538, then the NVDIMM blocks access to the 2LM data on the NVDIMM by the host computing system at 540. In some implementations, a reboot may be required in response to unsuccessful verification of the passphrase at 538.

To enable the features described in FIGS. 4 and 5A-5B, in some implementations, an opt-in mechanism may be utilized on the NVDIMM. The opt-in mechanism may be similar to an Apache Subversion™ (SVN) Downgrade Feature, and original equipment manufacturers (OEMs) can either enable this protection or ignore it, which will result in no low-power state locking. To do so, two bits in a control status register (CSR) that is visible to outside software may be used. First, an S3_Lock_Opt_In bit that serves as a global enable/disable feature. This bit may be set by an OEM only during an opt-in time window using a SMBus mail box firmware call. Once enabled, it will remain "True" and can only be reset using a Red Unlock. The default value may be "False". Second, an S3_Lock_Enable bit may be used as an enable/disable feature, assuming that the S3_Lock_Opt_In bit is set to "True". The S3_Lock_Enable bit can be set by a Basic Input/Output System (BIOS) or SMBus Management Module (SMM) at any time, after establishing a unique per-boot nonce. The default value may be "False". OEM customers can set the S3_Lock_Opt_In bit during the opt-in time window (which may be while the NVDIMM is at the OEM Factory/Platform), until the configuration is locked (Opt_in_feature=Locked). The CSR may then reflect the Opt-In status. Next, if the OEM has opted-in, the OEM can choose to enable/disable the feature anytime (e.g., while the NVDIMM is in OEM/Platform owner) using a BIOS/SMM call, after a secure nonce has been established between the platform and the NVDIMM. Both bits may be maintained in a parameter area of the NVDIMM and copied to CSR bits on each power cycle. Given that the SMM/BIOS nonce may be different in each boot cycle, this may protect against an attacker that would attempt to move the NVDIMM into an attacker platform while in an S3 state and disable the S3_Lock_Enable bit. To change the S3_Lock_Enable bit, the attacker would need to re-establish a new nonce with the NVDIMM, which would require a reboot, locking the PM and 2LM regions as described above.

Figure 6:
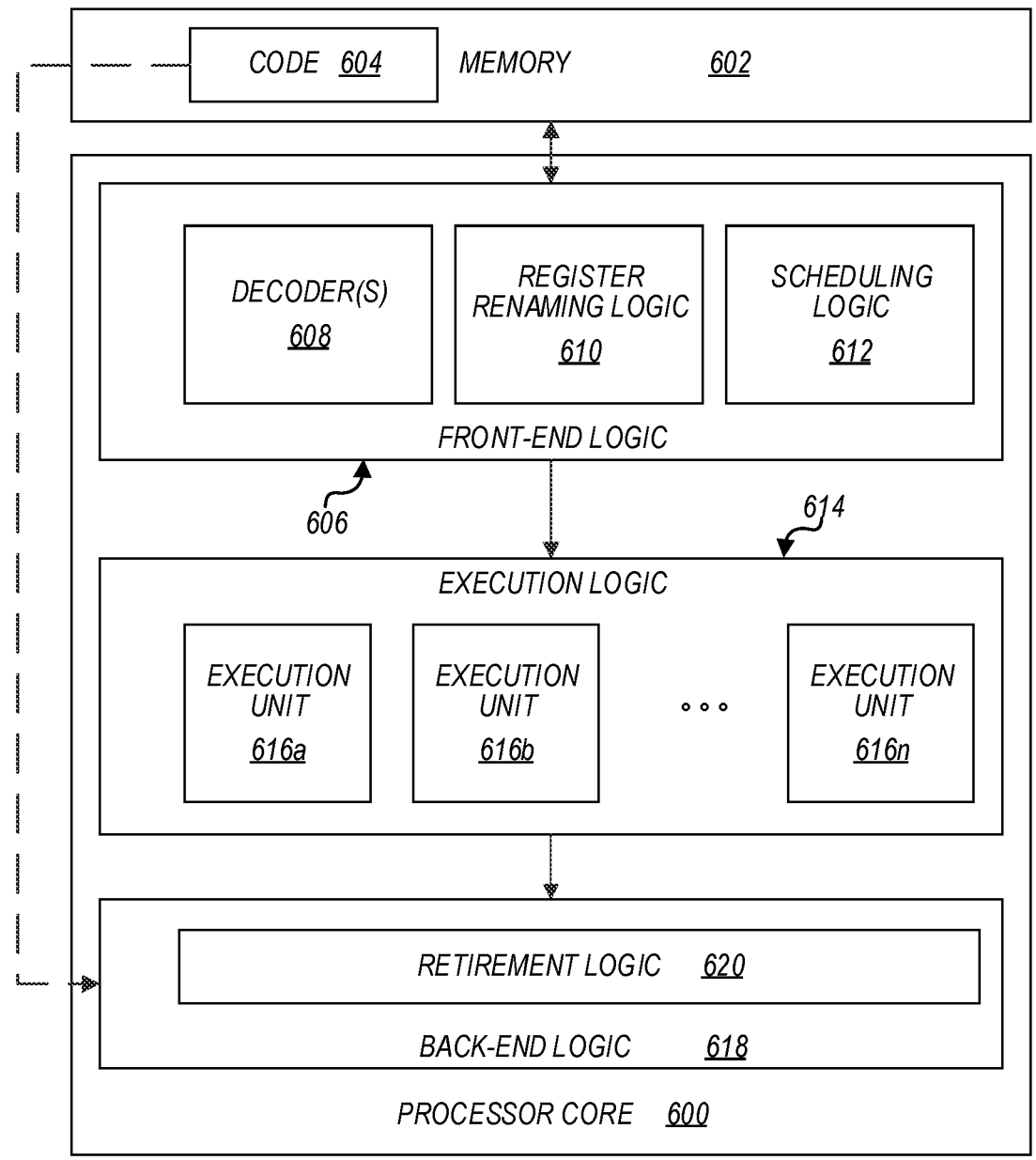
FIG. 6 is a block diagram illustrating an example processor core and memory according to at least one embodiment.
Figure 7:
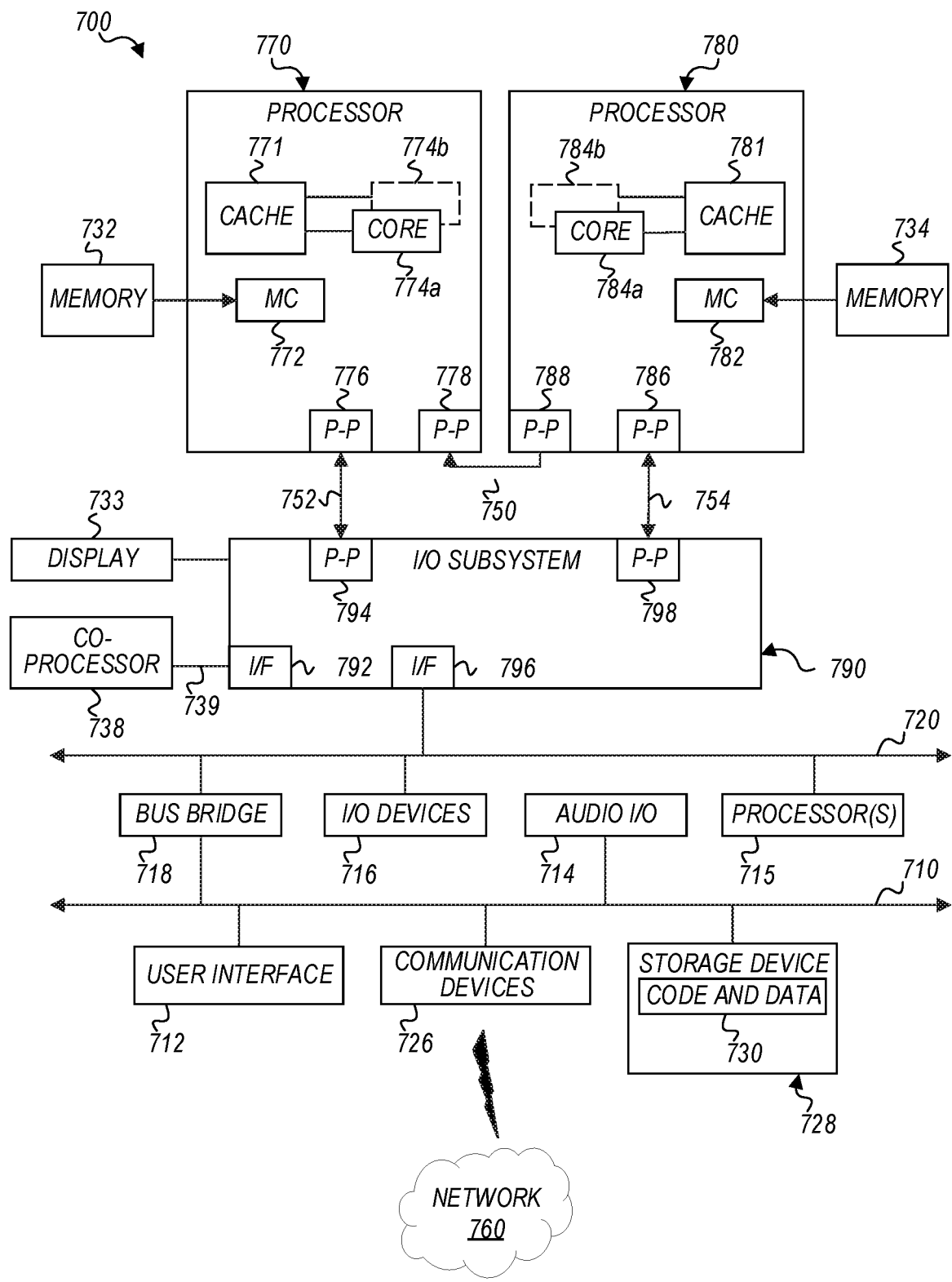
FIG. 7 is a block diagram of an example computer architecture according to at least one embodiment.

FIGS. 6-7 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 6-7.

FIG. 6 is an example illustration of a processor according to an embodiment. Processor 600 is an example of a type of hardware device that can be used in connection with the implementations above. Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the computing systems or computing devices described (e.g., host computing system 200) herein may be configured in the same or similar manner as computing system 700.

Processors 770 and 780 may be implemented as single core processors 774a and 784a or multi-core processors 774a-774b and 784a-784b. Processors 770 and 780 may each include a cache 771 and 781 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 770 and 780 may also each include integrated memory controller logic (MC) 772 and 782 to communicate with memory elements 732 and 734, which may be portions of main memory locally attached to the respective processors. In alternative embodiments, memory controller logic 772 and 782 may be discrete logic separate from processors 770 and 780. Memory elements 732 and/or 734 may store various data to be used by processors 770 and 780 in achieving operations and functionality outlined herein.

Processors 770 and 780 may be any type of processor, such as those discussed in connection with other figures. Processors 770 and 780 may exchange data via a point-to-point (PtP) interface 750 using point-to-point interface circuits 778 and 788, respectively. Processors 770 and 780 may each exchange data with an input/output (I/O) subsystem 790 via individual point-to-point interfaces 752 and 754 using point-to-point interface circuits 776, 786, 794, and 798. I/O subsystem 790 may also exchange data with a high-performance graphics circuit 738 via a high-performance graphics interface 739, using an interface circuit 792, which could be a PtP interface circuit. In one embodiment, the high-performance graphics circuit 738 is a special-purpose processor, such as, for example, a high-throughput MIC processor, a network or communication processor, compression engine, graphics processor, GPGPU, embedded processor, or the like. I/O subsystem 790 may also communicate with a display 733 for displaying data that is viewable by a human user. In alternative embodiments, any or all of the PtP links illustrated in FIG. 7 could be implemented as a multi-drop bus rather than a PtP link.

I/O subsystem 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a user interface 712 (such as a keyboard, mouse, touchscreen, or other input devices), communication devices 726 (such as modems, network interface devices, or other types of communication devices that may communicate through a computer network 760), audio I/O devices 714, and/or a data storage device 728. Data storage device 728 may store code and data 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Other Notes and Examples

The following examples pertain to embodiments in accordance with this specification. It will be understood that one or more aspects of certain examples described below may be combined with or implemented in certain other examples, including examples not explicitly indicated.

Example 1 includes a data storage apparatus to be included in a host computing system. The data storage apparatus includes memory and controller circuitry coupled to the memory. The controller circuitry is to: detect a transition from a low-power state to a full-power state in the host computing system; receive a nonce value from a processor of the host computing system after the transition; verify the nonce value received from the processor; and allow access by the host computing system to data stored in the memory based on successful verification of the received nonce value.

Example 2 includes the subject matter of Example 1, and optionally, wherein the nonce value is a first nonce value, and the controller circuitry is further to: receive a second nonce value from the processor of the host computing system in response to a boot sequence in the host computing system; store the second nonce value in the memory; and verify the first nonce value based on the second nonce value.

Example 3 includes the subject matter of Example 2, and optionally, the controller circuitry is to verify the first nonce value by comparing the first and second nonce values.

Example 4 includes the subject matter of Example 1, and optionally, wherein the controller circuitry is to decrypt the nonce value received using a secret key established between the processor and the controller circuitry, or the controller circuitry is to verify the received nonce value by verifying a digital signature of the processor associated with the received nonce value.

Example 5 includes the subject matter of Example 1, and optionally, wherein the nonce value is a first nonce value, and the controller circuitry is further to: generate a second nonce value in response to a boot sequence in the host computing system; and transmit the second nonce value to the processor of the host computing system for verification by the host computing system.

Example 6 includes the subject matter of Example 1, and optionally, wherein the low-power state is an S3 system power state and the full-power state is an S0 system power state.

Example 7 includes the subject matter of Example 1, and optionally, further comprising a tamper detection sensor, wherein the controller circuitry is further to disable access to data stored in the memory in response to detection of tampering by the tamper detection sensor.

Example 8 includes the subject matter of Example 7, and optionally, wherein the controller circuitry is to disable access to data stored in the memory by erasing one or more keys to decrypt the data stored memory.

Example 9 includes a method comprising: detecting, by a non-volatile dual in-line memory module (NVDIMM) in a host computing system, a transition in the host computing system from a low-power state to a full-power state; receiving a nonce value from a processor of the host computing system after the transition; verifying, by the NVDIMM, the nonce value received from the processor; and allowing access by the host computing system to data stored on the NVDIMM based on successful verification of the received nonce value.

Example 10 includes the subject matter of Example 9, and optionally, wherein the nonce value is a first nonce value, and the method further comprises: receiving a second nonce value from the processor of the host computing system in response to a boot sequence in the host computing system; and storing the second nonce value in the NVDIMM; wherein verifying the first nonce value is based on verifying the first nonce value against the second nonce value.

Example 11 includes the subject matter of Example 10, and optionally, wherein verifying the first nonce value comprises comparing the first and second nonce values.

Example 12 includes the subject matter of Example 9, and optionally, further comprising decrypting the nonce value received using a secret key established between the processor and the NVDIMM, or verifying a digital signature of the processor associated with the received nonce value.

Example 13 includes the subject matter of Example 9, and optionally, wherein the nonce value is a first nonce value, and the method further comprises: generating, by the NVDIMM, a second nonce value in response to a boot sequence in the host computing system; and transmitting the second nonce value to the processor of the host computing system for verification by the host computing system.

Example 14 includes the subject matter of Example 9, and optionally, wherein the low-power state is an S3 system power state and the full-power state is an S0 system power state.

Example 15 includes a system comprising: a processor and a non-volatile dual in-line memory module (NVDIMM) coupled to the host processor. The NVDIMM comprises memory and a controller to: detect a transition from a low-power state to a full-power state in the system; receive a nonce value from the processor after the transition; verify the nonce value received from the processor; and allow access by the processor to data stored in the memory based on successful verification of the received nonce value.

Example 16 includes the subject matter of Example 15, and optionally, wherein the nonce value is a first nonce value, and the controller of the NVDIMM is further to: generate a second nonce value in response to a boot sequence in the system; transmit the second nonce value to the processor; receive a third nonce value from the processor; store the third nonce value in the memory; and verify the first nonce value based on the third nonce value.

Example 17 includes the subject matter of Example 16, and optionally, wherein verifying the first nonce value comprises comparing the first and second nonce values.

Example 18 includes the subject matter of Example 15, and optionally, wherein the controller is further to decrypt the nonce value received using a secret key established between the processor and the controller, or the controller is further to verify the nonce value by verifying a digital signature of the processor associated with the received nonce value.

Example 19 includes the subject matter of Example 15, and optionally, wherein the low-power state is an S3 system power state and the full-power state is an S0 system power state.

Example 20 includes a non-transitory computer-readable storage media comprising computer-executable instructions operable, when executed by at least one computer processor, to: detect a transition in a host computing system from a low-power state to a full-power state; obtain a nonce value from a processor of the host computing system after the transition; verify the nonce value obtained from the processor; and allow access by the host computing system to data stored on an non-volatile dual in-line memory module (NVDIMM) based on successful verification of the received nonce value.

Example 21 includes the subject matter of Example 20, and optionally, wherein the instructions are further operable to: generate a second nonce value in response to a boot sequence in the host computing system; transmit the second nonce value to the processor of the host computing system; receive a third nonce value from the processor; store the third nonce value; and verify the first nonce value based on the third nonce value.

Example 22 includes a memory module to be included in a host computing system, the memory module comprising: means for detecting a transition from a low-power state to a full-power state in the host computing system; means for receiving a nonce value from a processor of the host computing system after the transition; means for verifying the nonce value received from the processor; and means for allowing access by the host computing system to data stored on the memory module based on successful verification of the received nonce value.

Example 23 includes the subject matter of Example 22, and optionally, further comprising means for generating a second nonce value in response to a boot sequence in the host computing system; means for transmitting the second nonce value to the processor of the host computing system; means for receiving a third nonce value from the processor; means for storing the third nonce value; and means for verifying the first nonce value based on the third nonce value.

Example 24 includes a data storage apparatus to be included in a host computing system. The data storage apparatus includes memory and controller circuitry coupled to the memory. The controller circuitry is to: detect a first transition from a full-power state to a low-power state in the host computing system; lock the apparatus in response to detecting the first transition; detect a second transition from the low-power state to the full-power state in the host computing system; obtain one or more passphrases in response to detecting the second transition; verify the one or more passphrases; and allow access by the host computing system to data stored in the memory based on successful verification of the one or more passphrases.

Example 25 includes the subject matter of Example 24, and optionally, wherein the controller circuitry is to lock one or more of a persistent memory (PM) region of the memory and a second level memory (2LM) region of the memory.

Example 26 includes the subject matter of Example 24, and optionally, wherein the controller circuitry is to erase one or more keys to decrypt the data stored in the memory.

Example 27 includes the subject matter of Example 24, and optionally, wherein the controller circuitry is to obtain the one or more passphrases from a flash memory of the host computing system.

Example 28 includes the subject matter of Example 24, and optionally, wherein the controller circuitry is to verify the one or more passphrases by: generating a first end key based on an obtained passphrase and a static key of the apparatus; and comparing the first end key with a second end key previously stored on the apparatus.

Example 29 includes the subject matter of Example 24, and optionally, wherein the low-power state is an S3 system power state and the full-power state is an S0 system power state.

Example 30 includes the subject matter of Example 24, and optionally, further comprising a tamper detection sensor, wherein the controller circuitry is further to disable access to the data stored in the memory in response to detection of tampering by the tamper detection sensor.

Example 31 includes the subject matter of Example 30, and optionally, wherein the controller circuitry is to disable access to data stored in the memory by erasing one or more keys to decrypt the data stored in the memory.

Example 32 includes a method comprising: detecting, by a non-volatile dual in-line memory module (NVDIMM) in a host computing system, a first transition in the host computing system from a full-power state to a low-power state; locking the NVDIMM in response to detecting the first transition; detecting, by the NVDIMM, a second transition in the host computing system from the low-power state to the full-power state; obtaining one or more passphrases in response to detecting the second transition; verifying the one or more passphrases; and allowing access by the host computing system to data stored on the NVDIMM based on successful verification of the one or more passphrases.

Example 33 include the subject matter of Example 32, and optionally, wherein locking the NVDIMM comprises locking one or more of a persistent memory (PM) region of the NVDIMM and a second level memory (2LM) region of the NVDIMM.

Example 34 include the subject matter of Example 32, and optionally, wherein locking the NVDIMM comprises erasing one or more keys to decrypt the data stored on the NVDIMM.

Example 35 include the subject matter of Example 32, and optionally, wherein obtaining the one or more passphrases comprises obtaining the one or more passphrases from a flash memory of the host computing system.

Example 36 include the subject matter of Example 32, and optionally, wherein verifying the one or more passphrases comprises: generating a first end key based on an obtained passphrase and a static key of the NVDIMM; and comparing the first end key with a second end key previously stored on the NVDIMM.

Example 37 include the subject matter of Example 32, and optionally, wherein the low-power state is an S3 system power state and the full-power state is an S0 system power state.

Example 38 includes a system comprising: a processor and a non-volatile dual in-line memory module (NVDIMM) coupled to the host processor. The NVDIMM comprises memory and a controller to: detect a first transition from a full-power state to a low-power state in the system; lock the NVDIMM in response to detecting the first transition;

detect, by the NVDIMM, a second transition in the host computing system from the low-power state to the full-power state; obtain one or more passphrases in response to detecting the second transition; verify the one or more passphrases; and allow access by the host computing system to data stored on the NVDIMM based on successful verification of the one or more passphrases.

Example 39 includes the subject matter of Example 38, and optionally, wherein the controller of the NVDIMM is to lock one or more of a persistent memory (PM) region of the NVDIMM and a second level memory (2LM) region of the NVDIMM.

Example 40 includes the subject matter of Example 38, and optionally, wherein the controller of the NVDIMM is to erase one or more keys to decrypt the data stored on the NVDIMM.

Example 41 includes the subject matter of Example 38, and optionally, wherein the controller of the NVDIMM is to obtain the one or more passphrases from a flash memory of the host computing system.

Example 42 includes the subject matter of Example 38, and optionally, wherein the controller of the NVDIMM is to verify the one or more passphrases by: generating a first end key based on an obtained passphrase and a static key of the NVDIMM; and comparing the first end key with a second end key previously stored on the NVDIMM.

Example 43 includes the subject matter of Example 38, and optionally, wherein the low-power state is an S3 system power state and the full-power state is an S0 system power state.

Example 44 includes a non-transitory computer-readable storage media comprising computer-executable instructions operable, when executed by at least one computer processor, to: detect a first transition from a full-power state to a low-power state in a host computing system; lock a non-volatile dual in-line memory module (NVDIMM) in response to detecting the first transition; detect a second transition from the low-power state to the full-power state in the host computing system; obtain one or more passphrases in response to detecting the second transition; verify the one or more passphrases; and allow access by the host computing system to data stored on the NVDIMM based on successful verification of the one or more passphrases.

Example 45 includes the subject matter of Example 44, and optionally, wherein the instructions are to lock one or more of a persistent memory (PM) region of the NVDIMM and a second level memory (2LM) region of the NVDIMM.

Example 46 includes the subject matter of Example 44, and optionally, wherein the instructions are to erase one or more keys to decrypt the data stored on the NVDIMM.

Example 47 includes the subject matter of Example 44, and optionally, wherein the instructions are to obtain the one or more passphrases from a flash memory of the host computing system.

Example 48 includes the subject matter of Example 44, and optionally, wherein the instructions are to verify the one or more passphrases by: generating a first end key based on an obtained passphrase and a static key of the NVDIMM; and comparing the first end key with a second end key previously stored on the NVDIMM.

Example 49 includes a non-volatile dual in-line memory module (NVDIMM) to be included in a host computing system, the NVDIMM comprising: means for detecting a first transition from a full-power state to a low-power state in the host computing system; means for locking the NVDIMM in response to detecting the first transition; means for detecting a second transition from the low-power state to the full-power state in the host computing system; means for obtaining one or more passphrases in response to detecting the second transition; means for verifying the one or more passphrases; and means for allowing access by the host computing system to data stored on the NVDIMM based on successful verification of the one or more passphrases.

Example 50 includes the subject matter of Example 49, and optionally, further comprising: means for generating a first end key based on an obtained passphrase and a static key of the NVDIMM; and means for comparing the first end key with a second end key previously stored on the NVDIMM.

What is claimed is:

1. A data storage apparatus to be included in a host computing system, the data storage apparatus comprising:
   memory; and
   controller circuitry coupled to the memory to:
   detect a transition from a low-power state to a full-power state in the host computing system;
   receive a nonce value from a processor of the host computing system after the transition;
   verify the nonce value received from the processor;
   allow access by the host computing system to data stored in the memory based on successful verification of the received nonce value; and
   block access by the host computing system to the data stored in the memory based on unsuccessful verification of the received nonce value.

2. The apparatus of claim 1, wherein the nonce value is a first nonce value, and the controller circuitry is further to:
   receive a second nonce value from the processor of the host computing system in response to a boot sequence in the host computing system;
   store the second nonce value in the memory; and
   verify the first nonce value based on the second nonce value.

3. The apparatus of claim 2, wherein the controller circuitry is to verify the first nonce value by comparing the first and second nonce values.

4. The apparatus of claim 1, wherein the controller circuitry is to decrypt the nonce value received using a secret key established between the processor and the controller circuitry.

5. The apparatus of claim 1, wherein the nonce value is a first nonce value, and the controller circuitry is further to:
   generate a second nonce value in response to a boot sequence in the host computing system; and
   transmit the second nonce value to the processor of the host computing system for verification by the host computing system.

6. The apparatus of claim 1, further comprising a tamper detection sensor, wherein the controller circuitry is further to disable access to data stored in the memory in response to detection of tampering by the tamper detection sensor.

7. A method comprising:
   detecting, by a non-volatile dual in-line memory module (NVDIMM) in a host computing system, a transition in the host computing system from a low-power state to a full-power state;
   receiving a nonce value from a processor of the host computing system after the transition;
   verifying, by the NVDIMM, the nonce value received from the processor; and
   allowing access by the host computing system to data stored on the NVDIMM based on successful verification of the received nonce value.

8. The method of claim 7, wherein the nonce value is a first nonce value, and the method further comprises:
   receiving a second nonce value from the processor of the host computing system in response to a boot sequence in the host computing system; and
   storing the second nonce value in the NVDIMM;
   wherein verifying the first nonce value is based on verifying the first nonce value against the second nonce value.

9. The method of claim 8, wherein verifying the first nonce value comprises comparing the first and second nonce values.

10. The method of claim 7, further comprising decrypting the nonce value received using a secret key established between the processor and the controller.

11. The method of claim 7, wherein the nonce value is a first nonce value, and the method further comprises:
   generating, by the NVDIMM, a second nonce value in response to a boot sequence in the host computing system; and
   transmitting the second nonce value to the processor of the host computing system for verification by the host computing system.

12. The method of claim 7, wherein the low-power state is an S3 system power state and the full-power state is an S0 system power state.

13. A data storage apparatus to be included in a host computing system, the data storage apparatus comprising:
   memory; and
   controller circuitry coupled to the memory to:
      detect a first transition from a full-power state to a low-power state in the host computing system;
      lock the apparatus in response to detecting the first transition;
      detect a second transition from the low-power state to the full-power state in the host computing system;
      obtain one or more passphrases in response to detecting the second transition;
      verify the one or more passphrases;
      allow access by the host computing system to data stored in the memory based on successful verification of the one or more passphrases;
      block access by the host computing system to the data stored in the memory based on unsuccessful verification of the one or more passphrases.

14. The apparatus of claim 13, wherein the controller circuitry is to lock one or more of a persistent memory (PM) region of the memory and a second level memory (2LM) region of the memory.

15. The apparatus of claim 13, wherein the controller circuitry is to erase one or more keys to decrypt the data stored in the memory.

16. The apparatus of claim 13, wherein the controller circuitry is to obtain the one or more passphrases from a flash memory of the host computing system.

17. The apparatus of claim 13, wherein the controller circuitry is to verify the one or more passphrases by:
   generating a first end key based on an obtained passphrase and a static key of the apparatus; and
   comparing the first end key with a second end key previously stored on the apparatus.

18. The apparatus of claim 13, further comprising a tamper detection sensor, wherein the controller circuitry is further to disable access to the data stored in the memory in response to detection of tampering by the tamper detection sensor.

19. A non-transitory computer-readable storage media comprising computer-executable instructions operable, when executed by at least one computer processor, to:
   detect a first transition from a full-power state to a low-power state in a host computing system;
   lock a non-volatile dual in-line memory module (NVDIMM) in the host computing system in response to detecting the first transition;
   detect a second transition from the low-power state to the full-power state in the host computing system;
   obtain one or more passphrases in response to detecting the second transition;
   verify the one or more passphrases; and
   allow access by the host computing system to data stored on the NVDIMM based on successful verification of the one or more passphrases.

20. The computer-readable storage media of claim 19, wherein the instructions are to lock one or more of a persistent memory (PM) region of the NVDIMM and a second level memory (2LM) region of the NVDIMM.

21. The computer-readable storage media of claim 19, wherein the instructions are to erase one or more keys to decrypt the data stored on the NVDIMM.

22. The computer-readable storage media of claim 19, wherein the instructions are to obtain the one or more passphrases from a flash memory of the host computing system.

23. The computer-readable storage media of claim 19, wherein the instructions are to verify the one or more passphrases by:
   generating a first end key based on an obtained passphrase and a static key of the NVDIMM; and
   comparing the first end key with a second end key previously stored on the NVDIMM.

24. The computer-readable storage media of claim 19, wherein the low-power state is an S3 system power state and the full-power state is an S0 system power state.

* * * * *